(12) United States Patent
Ozkan et al.

(10) Patent No.: US 12,012,662 B2
(45) Date of Patent: Jun. 18, 2024

(54) MATERIALS FOR AMMONIA SYNTHESIS

(71) Applicant: OHIO STATE INNOVATION FOUNDATION, Columbus, OH (US)

(72) Inventors: Umit Ozkan, Columbus, OH (US); Seval Gunduz, Columbus, OH (US); Dhruba Jyoti Deka, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/307,289

(22) Filed: Apr. 26, 2023

(65) Prior Publication Data

US 2023/0287585 A1   Sep. 14, 2023

Related U.S. Application Data

(62) Division of application No. 16/742,390, filed on Jan. 14, 2020, now Pat. No. 11,674,231.

(Continued)

(51) Int. Cl.
  *C25B 1/27* (2021.01)
  *C01G 49/00* (2006.01)
  *C01G 51/00* (2006.01)
  *C01G 53/00* (2006.01)
  *C04B 35/26* (2006.01)
(Continued)

(52) U.S. Cl.
  CPC .......... *C25B 11/069* (2021.01); *C01G 49/009* (2013.01); *C01G 51/70* (2013.01); *C01G 53/70* (2013.01); *C04B 35/2633* (2013.01); *C04B 35/2641* (2013.01); *C04B 35/58042* (2013.01); *C25B 1/00* (2013.01); *C25B 1/27* (2021.01); *C25B 9/19* (2021.01); *C25B 9/23* (2021.01); *C25B 11/047* (2021.01); *C25B 11/051* (2021.01); *C25B 11/0773* (2021.01); *C25B 13/04* (2013.01); *C25B 13/07* (2021.01); *C01P 2002/34* (2013.01); *C01P 2002/50* (2013.01);

(Continued)

(58) Field of Classification Search
  CPC ....... C25B 1/27; C25B 11/069; C25B 11/051; C25B 11/0773; C25B 11/23
  See application file for complete search history.

(56) References Cited

U.S. PATENT DOCUMENTS

2004/0020766 A1   2/2004   Wang

FOREIGN PATENT DOCUMENTS

EP   089199   *   3/1983

OTHER PUBLICATIONS

Amar. Electrochemical synthesis of ammonia from wet nitrogen via a dual-chamber reactor using La0.6Sr0.4Co0.2Fe0.8O3-δ—Ce0.8Gd0.18Ca0.02O2-δ composite cathode. Catalysis Today vol. 286, May 15, 2017, pp. 51-56 (Year: 2017).*

(Continued)

*Primary Examiner* — Matthew E. Hoban
(74) *Attorney, Agent, or Firm* — Meunier Carlin & Curfman LLC

(57) ABSTRACT

Disclosed herein are doped perovskite oxides. The doped perovskite oxides may be used as a cathode material in an electrochemical cell to electrochemically generate ammonia from $N_2$. The doped perovskite oxides may be combined with nitride compounds, for instance iron nitride, to further increase the efficiency of the ammonia production.

12 Claims, 9 Drawing Sheets

Related U.S. Application Data

(60) Provisional application No. 62/791,968, filed on Jan. 14, 2019.

(51) Int. Cl.
*C04B 35/58* (2006.01)
*C25B 1/00* (2021.01)
*C25B 9/19* (2021.01)
*C25B 9/23* (2021.01)
*C25B 11/047* (2021.01)
*C25B 11/051* (2021.01)
*C25B 11/069* (2021.01)
*C25B 11/077* (2021.01)
*C25B 13/04* (2021.01)
*C25B 13/07* (2021.01)

(52) U.S. Cl.
CPC .. *C01P 2006/40* (2013.01); *C04B 2235/3274* (2013.01); *C04B 2235/3852* (2013.01)

(56) References Cited

OTHER PUBLICATIONS

Ozkan et al., Metal Nitride-type Cathode Catalysts for Electrocatalytic Ammonia Production. Presented at Annual Conference of American Institute of Chemical Engineers in Pittsburgh, PA., on Oct. 10, 2018, 23 pages.

Sundmacher, Kai, L. K. Rihko-Struckmann, and Vladimir Galvita. "Solid electrolyte membrane reactors: Status and trends." Catalysis Today 104.2-4 (2005): 185-199.

"Introduction to ammonia production." Metal Nitride-type Cathode Catalysts for Electrocatalytic Ammonia Production. 2016, 24 pages.

Wu, Kuan-Ting, and Tatsumi Ishihara. "CO2/H2o High Temperature Co-Electrolysis Using LaFeO3-Based Oxide Cathode." Electrochemical Society Meeting Abstracts 230. No. 39. The Electrochemical Society, Inc., 2016.

Afifah, Nur, and Rosari Saleh. "Synthesis, characterization and catalytic properties of perovskite LaFeO3 nanoparticles." Journal of Physics: Conference Series. vol. 710. No. 1. IOP Publishing, 2016.

* cited by examiner

MATERIALS FOR AMMONIA SYNTHESIS

CROSS-REFERENCE TO RELATED APPLICATION

This application is a divisional of U.S. patent application Ser. No. 16/742,390, filed on Jan. 14, 2020, which claims the benefit of U.S. Provisional Application 62/791,968, filed on Jan. 14, 2019, the entire contents of which are hereby incorporated in their entirety.

STATEMENT OF GOVERNMENT SUPPORT

This invention was made with government support under Grant no. CHE-1213443 awarded by the National Science Foundation. The government has certain rights in the invention.

FIELD OF THE INVENTION

The application relates to perovskite oxide compositions useful as catalysts for the synthesis of ammonia from nitrogen gas and water. The compositions can further be combined with nitride compounds to enhance the efficiency of the process.

BACKGROUND

Ammonia ($NH_3$) is an important industrial chemical, and a critical component in fertilizer production. Historically, the Haber-Bosch process has been used for large scale ammonia production. This process converts nitrogen and hydrogen gas to ammonia according to the reaction $N_2+3H_2\rightarrow 2NH_3$. Although the overall efficiency of the process is good, the process requires high pressures and hydrogen gas, which is typically sourced from fossil fuels.

Electrocatalytic processes, which can be conducted at atmospheric pressures, and in which hydrogen is sources from water, is an appealing alternative to the Haber-Bosch process. Generally, water and nitrogen gas are combined at a cathode to product ammonia and oxide anion ($O^{2-}$), and the oxide anion is converted to oxygen gas at the anode. Typically, the cathode material catalyzes the formation of ammonia from water and nitrogen. There are several different electrocatalytic modalities known, include liquid electrolyte cells, molten salt electrolytes, composite membranes, and solid-state electrolytes. The later is especially attractive due to the enhanced reaction rate compared with liquid electrolytes.

Several features are important for a successful solid-state electrocatalytic reactor: (i) the cathode/catalyst material should possess high electrical conductivity; (ii) the material should possess high oxide anion conductivity; (ii) the material should have high thermal stability; and (iii) the material should have a suitable thermal expansion coefficient.

There remains a need for improved methods for manufacturing ammonia from cheap and abundant feedstocks. There remains a need for materials having the aforementioned constellation of attributes beneficial for electrochemical production of ammonia. There remains a need for improved electrochemical cells for the production of ammonia.

SUMMARY OF THE INVENTION

Disclosed herein are perovskite oxides having high electrical conductivity, high oxide anion conductivity, high thermal stability and suitable thermal expansion coefficients. The perovskite oxides are useful as cathode materials in a wide variety of different electrochemical cells, including solid-state electrochemical cells for the electrocatalytic production of ammonia. The perovskite oxides can be combined with one or more additional active materials to further enhance the electrochemical production of ammonia. Suitable active materials include transition metal nitrides, including iron nitride.

The details of one or more embodiments are set forth in the description below. Other features, objects, and advantages will be apparent from the description and from the claims.

DETAILED DESCRIPTION

Figure 1A:
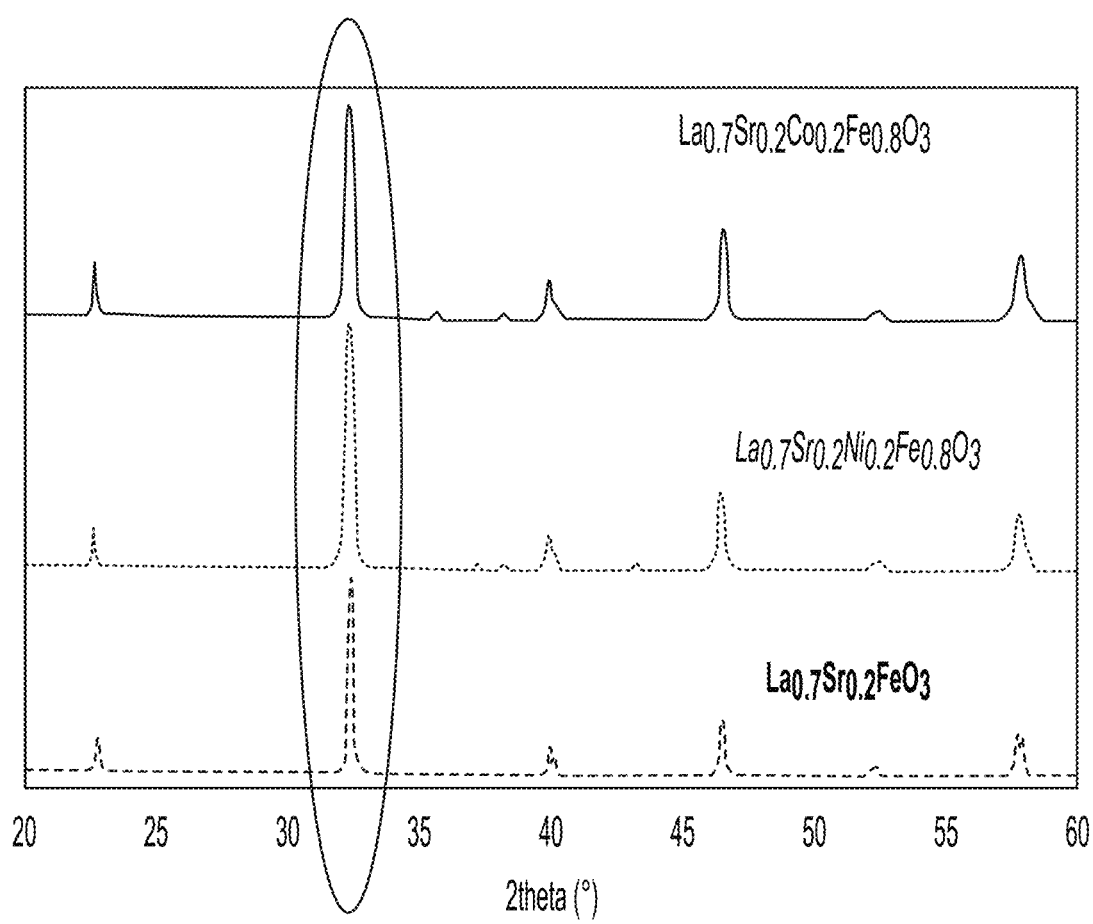
FIG. 1A depicts x-ray diffraction analysis for several doped perovskite oxides, showing the presence of an orthorhombic phase.
Figure 1B:
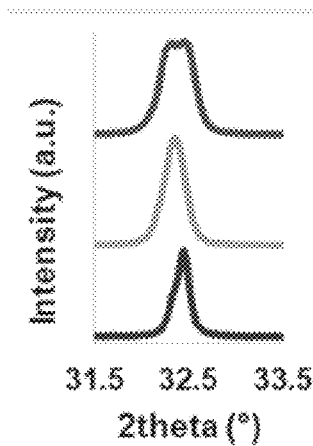
FIG. 1B depicts an enlarged view of the encircled peaks in FIG. 1A. The splitting and broadening of the encircled peaks signifies the presence of a rhombohedral phase along with the orthorhombic phase in $La_{0.7}Sr_{0.2}Co_{0.2}Fe_{0.8}O_3$.
Figure 2:
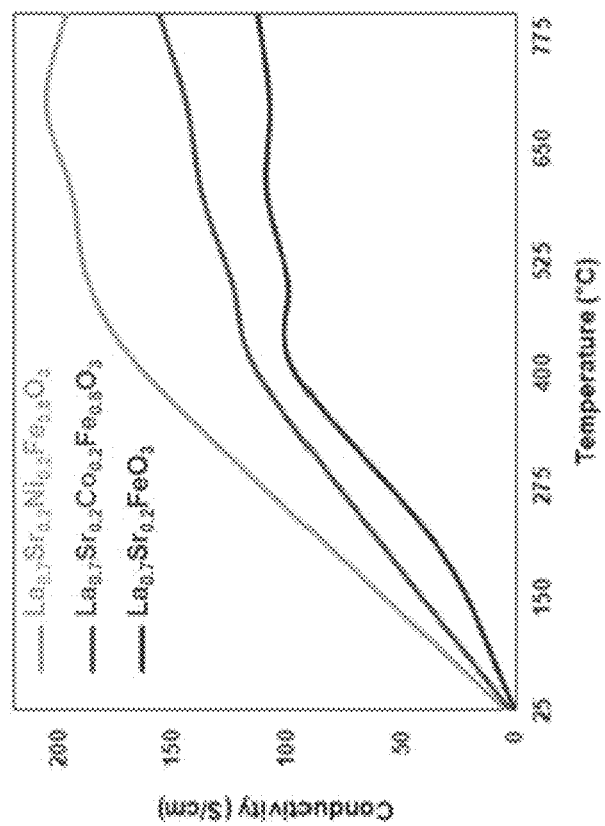
FIG. 2 depicts the electrical conductivity for several doped perovskite oxides as a function of temperature.
Figure 3:
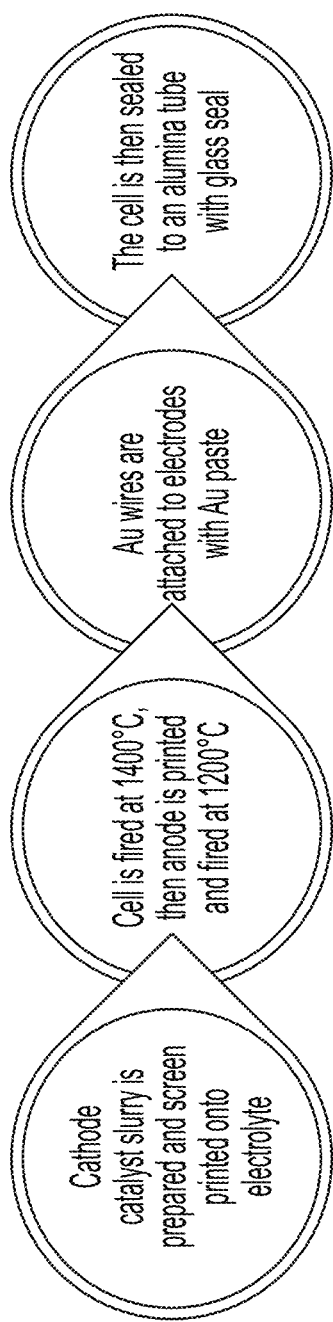
FIG. 3 depicts a process schematic for the production of a button cell.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed herein are perovskite oxides useful as cathode materials in electrochemical cells, including cells for the electrocatalytic production of ammonia. The electrochemical production of ammonia involves the following steps.

(a) electrochemically reducing $H_2O$ and $N_2$ at a cathode to provide $NH_3$ and $O_2^-$; and
(b) oxidizing the $O_2^-$ to give oxygen gas.

The perovskite oxides disclosed herein have the general structure $ABO_3$, wherein the A metal is typically an alkaline earth metal or rare earth element and the B metal is a transition metal, preferably iron. The ionic and electroconductivity of perovskites can be modified by doping the material either at the A-site or B-site. Preferred dopants at the A-site include lanthanide metals such as La, Ce, Pr, Nd, Sm, Eu, Gd, Tb, Dy, Ho, Er, Tm, Yb, and Lu. In general, it is preferred that the doping metals are aliovalent with the A and B metals, e.g., that they have different valencies.

In certain embodiments, the doped perovskite can be a compound of Formula (I):

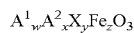 [Formula (I)], wherein:
$A^1$ is a lanthanide;
$A^2$ is an alkaline earth metal;
X is one or more metals in the +1 or +2 oxidation state;
w is from 0.5-1.0;
x is from 0-0.5;
y is from 0-0.5; and
z is from 0.5 to less than 1.0;
wherein w, x, y, and z are chosen to maintain electroneutrality.

Suitable $A^1$ lanthanides include La, Tb, Gd, Sm, Pr, and Nd, and suitable $A^2$ alkaline earth metals include Sr, Mg, Ca, and Ba.

Suitable X metals include Ni, Co, Ti, Mn, Zn, Cu, Li, Al, Sc, V, Cr, Ga, Ge, Y, Zr, Nb, In, V, W, Mb, Pd, Pt, Ag, Au, Cd, and combinations thereof.

In certain embodiments, $A^1$ can be lanthanum, e.g., a compound of Formula (II):

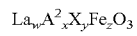 [Formula (II)], wherein $A^2$, X, w, x, y and z are as defined above.

In some embodiments, $A^2$ can be strontium, e.g., a compound of Formula (III):

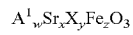 [Formula (III)], wherein $A^1$, X, w, x, y and z are as defined above.

In certain preferred embodiments, $A^1$ can be lanthanum and $A^2$ can be strontium, e.g., a compound of Formula (IV):

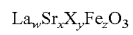 [Formula (IV)], wherein X, w, x, y and z are as defined above.

For any of the compounds of Formula (I), (II), (III), and (IV), X can be absent (e.g., y=0). For embodiments in which y is not 0, preferred X metals include Co and Ni.

For any of the compounds of Formula (I), (II), (III), and (IV):
 w can be from 0.5-1.0; 0.5-0.9; 0.5-0.8; 0.5-0.7; 0.5-0.6; 0.6-1.0; 0.6-0.9; 0.6-0.8; 0.6-0.7; 0.65-0.75; 0.75-0.85; or 0.55-0.65;
 x can be from 0-0.5; 0.05-0.5; 0.1-0.5; 0.15-0.5; 0.2-0.5; 0.25-0.5; 0.3-0.5, 0.35-0.5; 0.05-0.1; 0.05-0.15; 0.1-0.2; 0.15-0.25; 0.2-0.3; 0.25-0.35; 0.3-0.4; 0.35-0.45; or 0.4-0.5.
 y can be from 0-0.5; 0.05-0.5; 0.1-0.5; 0.15-0.5; 0.2-0.5; 0.25-0.5; 0.3-0.5; 0.35-0.5; 0.05-0.1; 0.05-0.15; 0.1-0.2; 0.15-0.25; 0.2-0.3; 0.25-0.35; 0.3-0.4; 0.35-0.45; or 0.4-0.5; and
 z can be from 0.5 to less than 1.0; 0.5-0.9; 0.5-0.8; 0.5-0.7; 0.5-0.6; 0.6-1.0; 0.6-0.9; 0.6-0.8; 0.6-0.7; 0.65-0.75; 0.75-0.85; or 0.55-0.65.

In preferred embodiments, w is from 0.6 to 0.8, x is from 0.15 to 0.25, y is from 0.15 to 0.25, and z is from 0.5 to less than 1. In such implementations, $A^1$ can be La, $A^2$ can an alkali earth metal, including Be, Mg, Ca, Sr, or Ba, and X is Co or Ni.

The doped perovskite oxides can be obtained by a sol-gel or co-precipitation process. In a preferred implementation, a solution of $A^1$, $A^2$, X, and Fe salts in relative molar concentrations corresponding to the molar concentration of the final perovskite oxide can be converted to a gel and then calcined to give the perovskite oxide. Nitrate salts are particularly convenient, but other counterions may be used as known in the art. The solution is combined with a chelating agent (e.g., EDTA and/or citric acid) and/or a polyol (e.g., ethylene glycol) under pH control to form a gel, which is then dried and later calcined to the give the perovskite oxide.

In certain implementations, one or more doped perovskite oxides can be further combined with one or more nitride compounds having the formula $M_aN_b$, wherein M can be Fe, Mb, Co, Cr, or V (preferably Fe), a can be 1, 2, 3, or 4, and b can be 1, 2, 3, or 4. The weight ratio of the perovskite oxide(s) to nitride compound(s) can be from 10:1 to 1:10, from 5:1 to 1:5, from 1:2 to 2:1, from 1:1 to 10:1, from 1:1 to 5:1, from 1:1 to 3:1, from 1:1 to 1:10, from 1:1 to 1:5, or from 1:1 to 1:3. The nitride compounds, prior to combination with the perovskite oxide compounds, can be substantially free of oxides (e.g., $M_{a'}O_{b'}$, wherein a' and b' are selected to maintain electroneutrality) and can be substantially free of the reduced metal $M^0$. As used herein, substantially free can mean no more than 10%, no more than 5%, no more than 1%, or no detectable (by x-ray diffraction) of any the above described impurities.

The doped perovskite oxides, either alone or in combination with one or more nitride compounds, can be used as a cathode material in an electrochemical cell. The doped perovskite oxides and nitride compounds can be crystalline, amorphous, or a mixture thereof. Generally, the electrochemical cell is a solid oxide electrolyte cell. The electrochemical cells can be used for the production of numerous useful materials, including hydrogen gas, water, and especially ammonia. In such implementations, nitrogen gas and water feedstocks are electrochemically converted to oxygen and ammonia. The ammonia may be captured using conventional techniques, including reaction with an aqueous acid to trap the material as an ammonium salt. Thus, in some implementations, the electrochemical cell can include a cathode as described here, in ionic communication with an anode, with a proton-conductive electrolyte disposed between the cathode and anode. The electrochemical cell may be in fluid communication with one or more feedstocks, for instance water, air, or nitrogen gas. In some embodiments, the feedstock can be a combination of water, air, and/or nitrogen gas. As used herein, nitrogen gas refers to a feedstock having a higher concentration of nitrogen relative to the amount of nitrogen naturally found in air. The electrochemical cell can also be in fluid communication with an ammonia trap, for instance an aqueous acid or an acidic resin.

A variety of suitable anodes can be used in the electrochemical cells disclosed herein. In some instances, the anode can palladium, platinum, silver, gold, yttria stabilized zirconia, lanthanum strontium manganate, or a combination thereof. The anode can further include at least one doped fluorite oxide, for instance yttria stabilized zirconia, GDC, and $ABO_3$-type perovskite oxides where A is selected from alkaline earth metals and lanthanoids and B is one or more transition metals.

Figure 4:
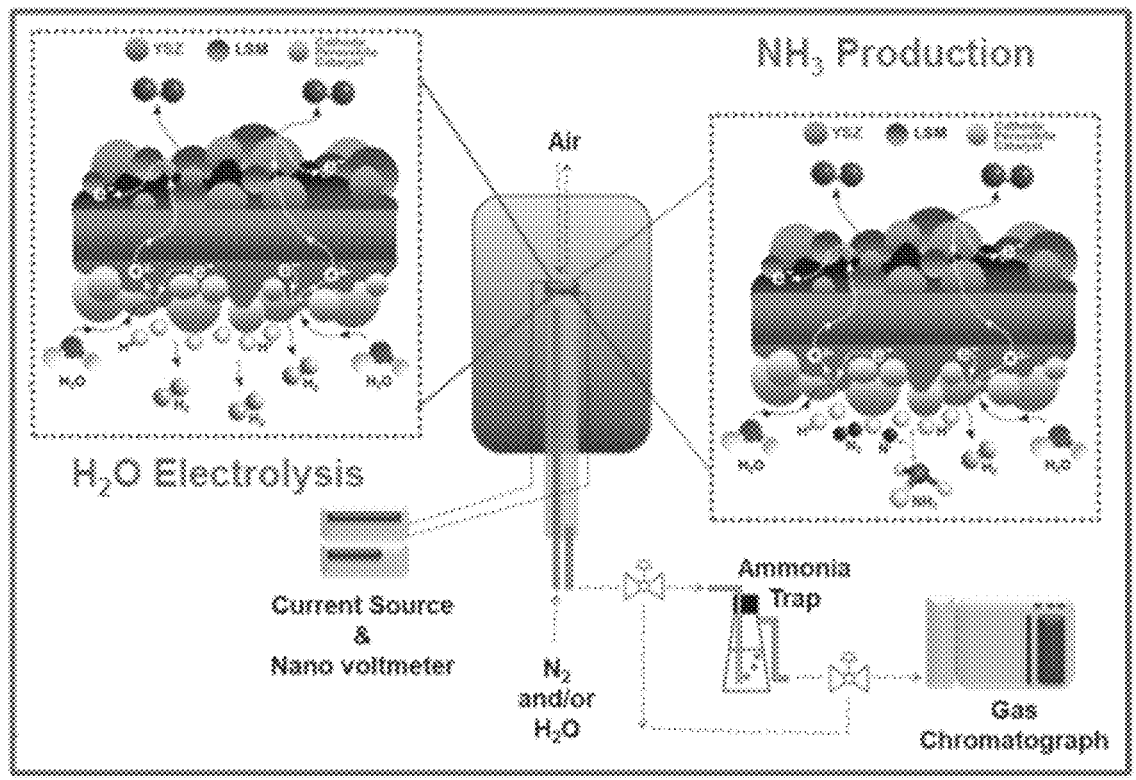
FIG. 4 depicts a process schematic for the electocatalytic production of ammonia.
Figure 5A:
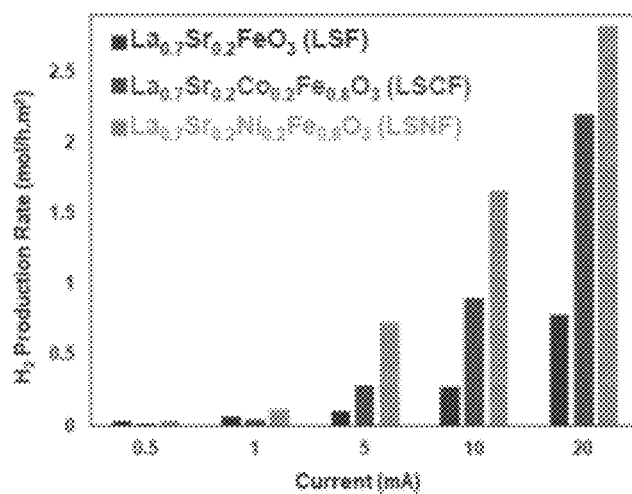
FIG. 5A depicts rate for the electrocatalytic production of hydrogen gas with several doped perovskite oxides.
Figure 5B:
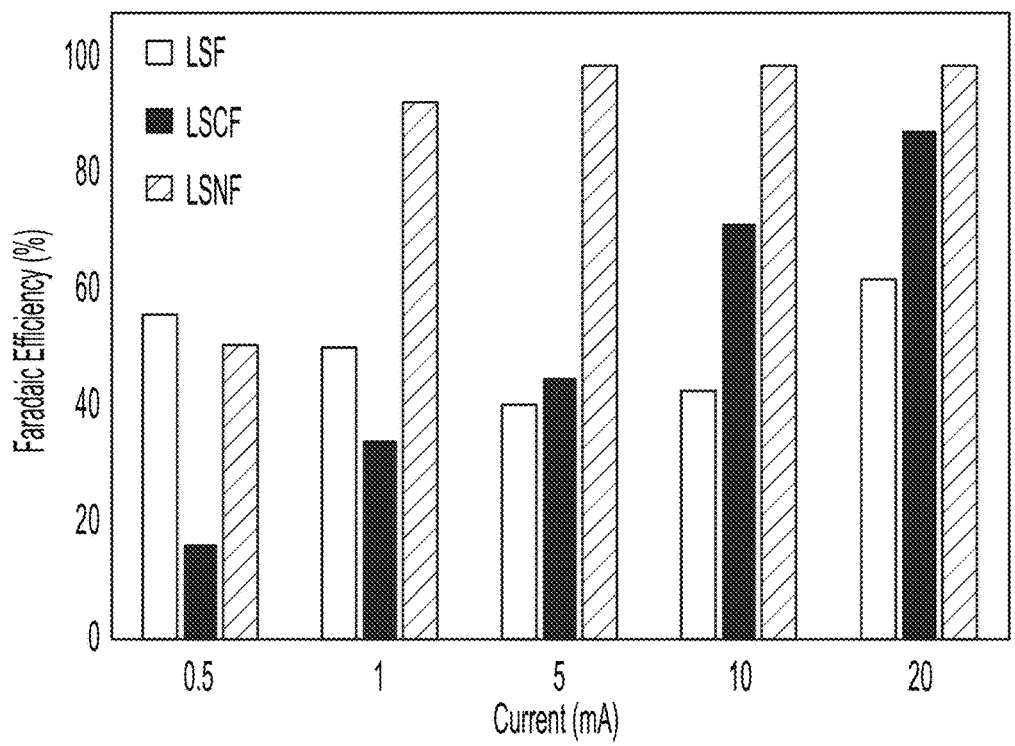
FIG. 5B depicts the Faradaic efficiency (defined as the fraction of $H^+$ that reacts with $N_2$ to form ammonia) for several doped perovskite oxide.
Figure 5C:
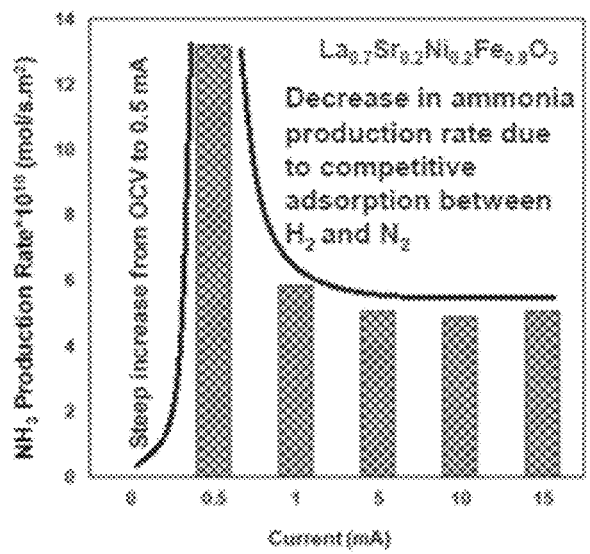
FIG. 5C depicts the ammonia production rate at different currents for $La_{0.7}Sr_{0.2}Co_{0.2}Fe_{0.8}O_3$. For water electrolysis, a 3% $H_2O$ in helium feed composition was used, at a temperature of 600° C., at 1 atm. For ammonia production, a 3% $H_2O$ in nitrogen gas feed composition was used, at a temperature of 600° C., at 1 atm.
Figure 6:
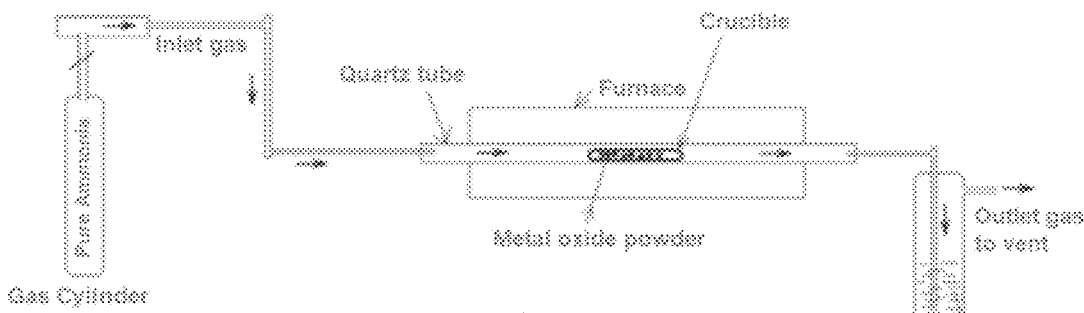
FIG. 6 depicts a schematic for the production of $Fe_3N$ from $Fe_2O_3$ nanopowder. The resulting product has a hexagonal crystal structure with six iron and 2 nitrogen atoms in the unit cell.
Figure 7:
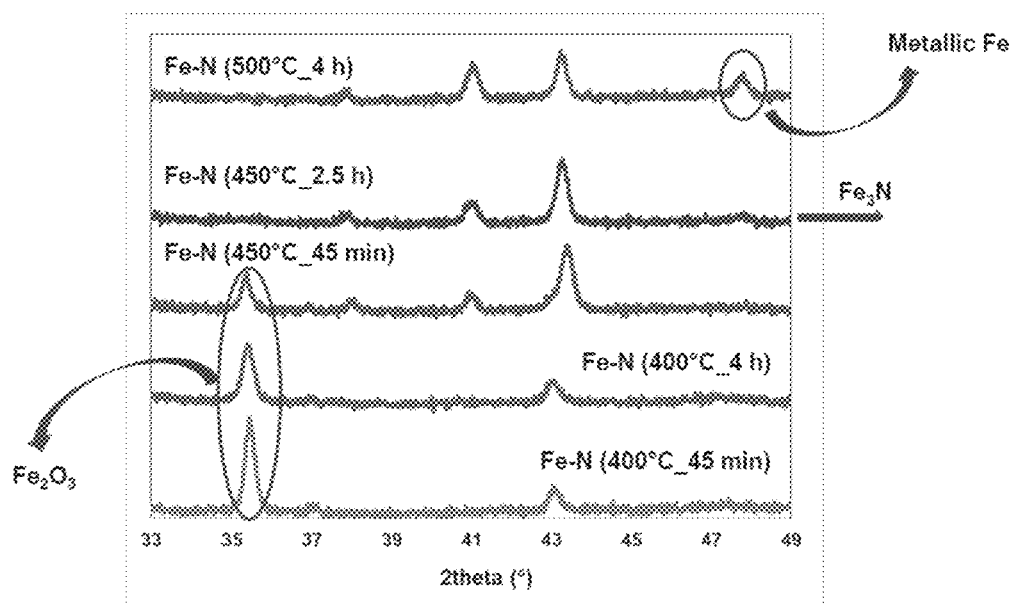
FIG. 7 depicts x-ray diffraction analysis for $Fe_3N$ prepared using the apparatus depicts in FIG. 6. The synthesis was conducted at 500° C. for 4 hours, 450° C. for 2.5 hours, 400° C. for 45 minutes, 400° C. for four hours, and 400° C. for 45 minutes. The analysis shows that the product prepared at 450° C. for 2.5 hours does not include any $Fe_2O_3$ or $Fe^0$ phase.
Figure 8:
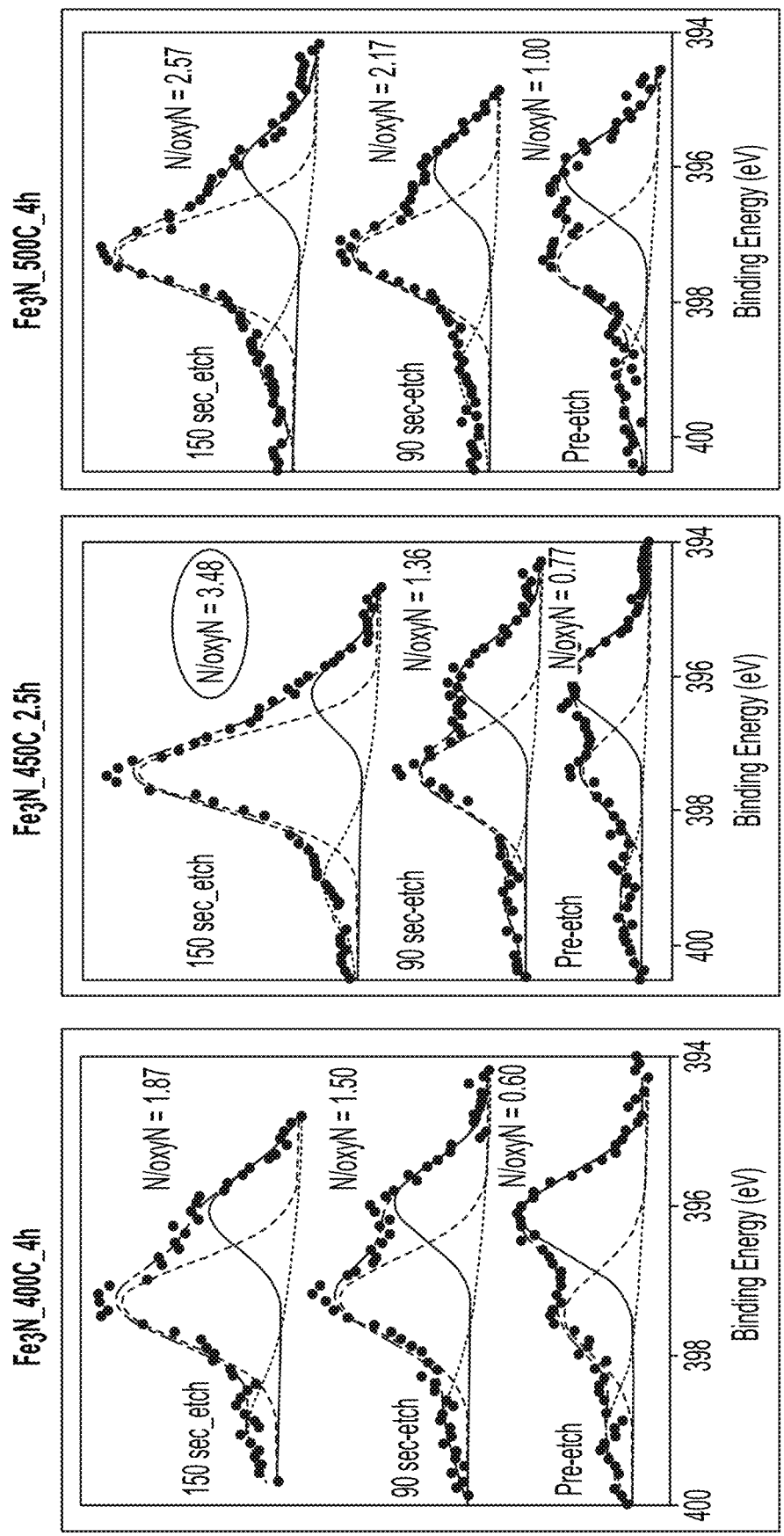
FIG. 8 depicts the results of surface etching of $Fe_3N$ with an argon ion gun.
Figure 9:
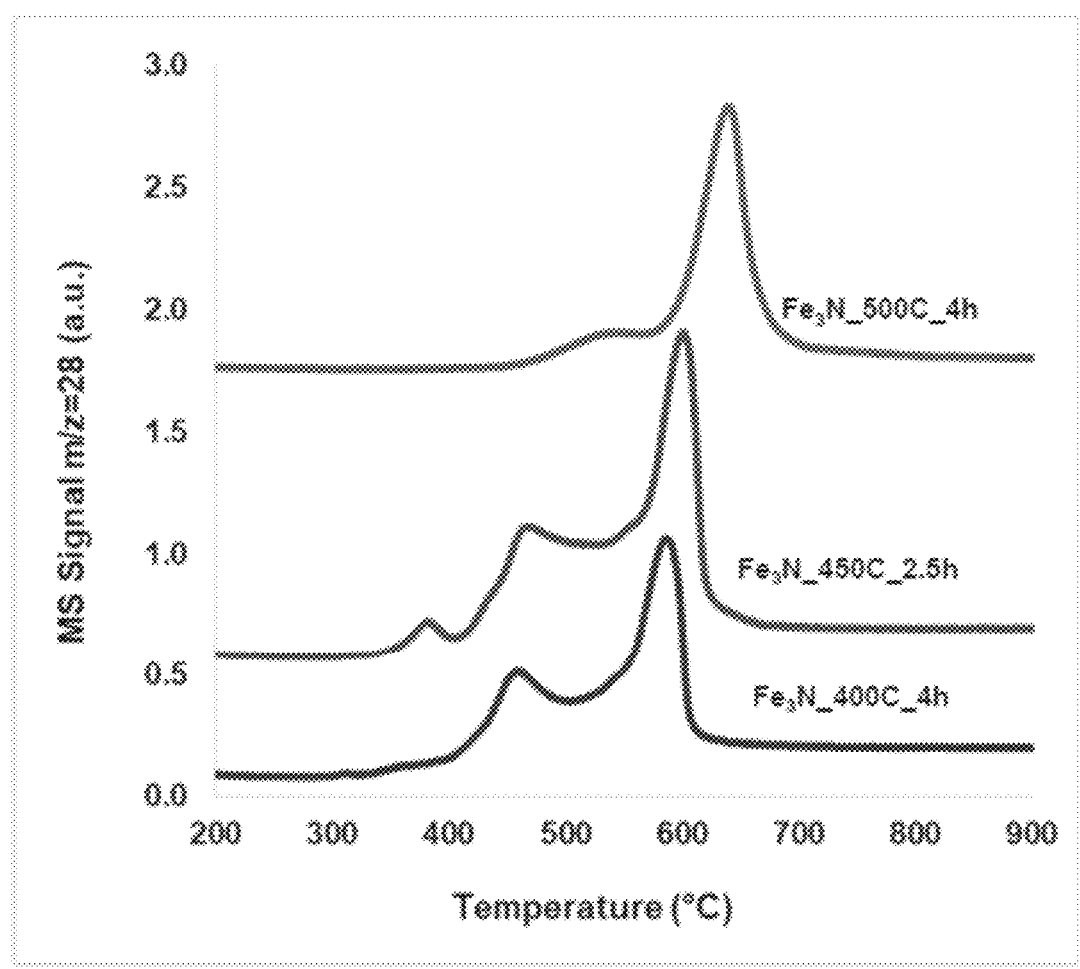
FIG. 9 depicts the nitrogen released by temperature-programmed decomposition of $Fe_3N$. Integration of the mass spectrometry signal for nitrogen indicates that $Fe_3N$ prepared at 450° C. for 2.5 hours exhibited the greatest $N_2$ release.
Figure 10:
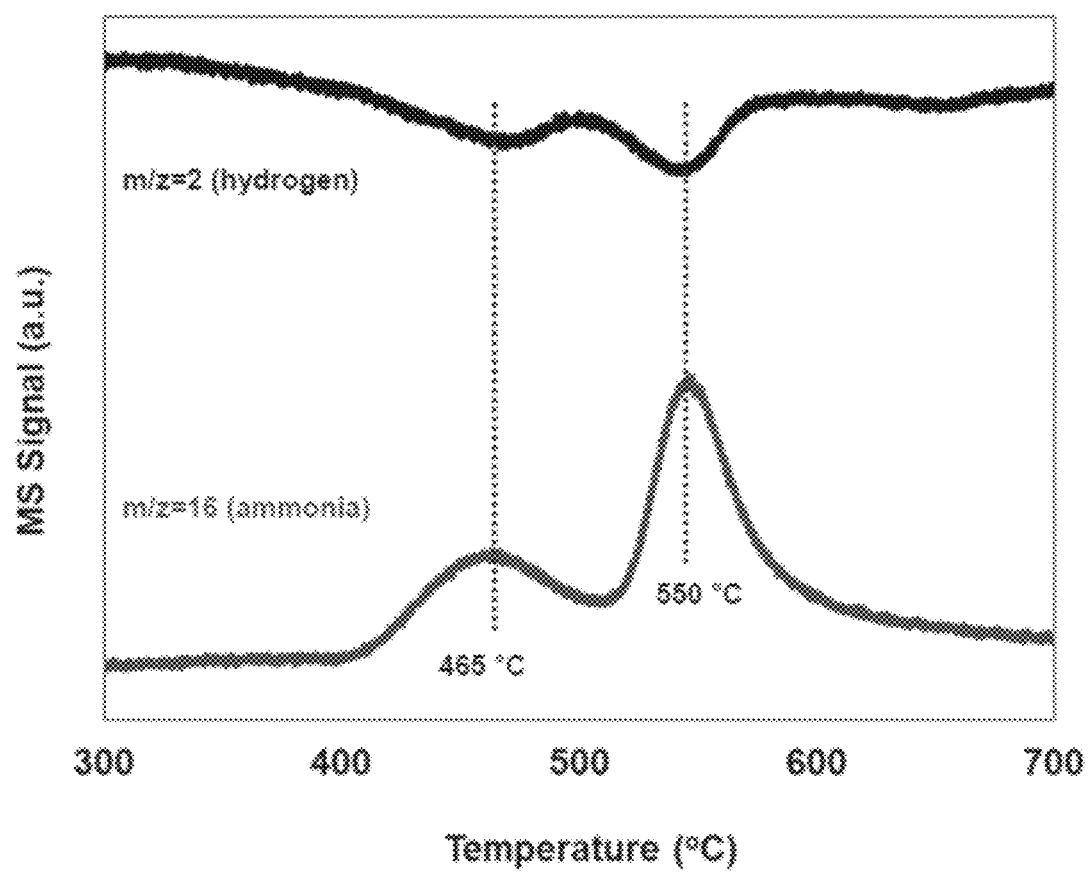
FIG. 10 depicts the mobility and accessibility of lattice nitrogen in $Fe_3N$ prepared at 450° C. for 2.5 hours. The material was heated at a rate of 10° C./min in a 5% $H_2$/He environment, resulting in the reaction with $H_2$ to form ammonia at atmospheric pressure.
Figure 11:
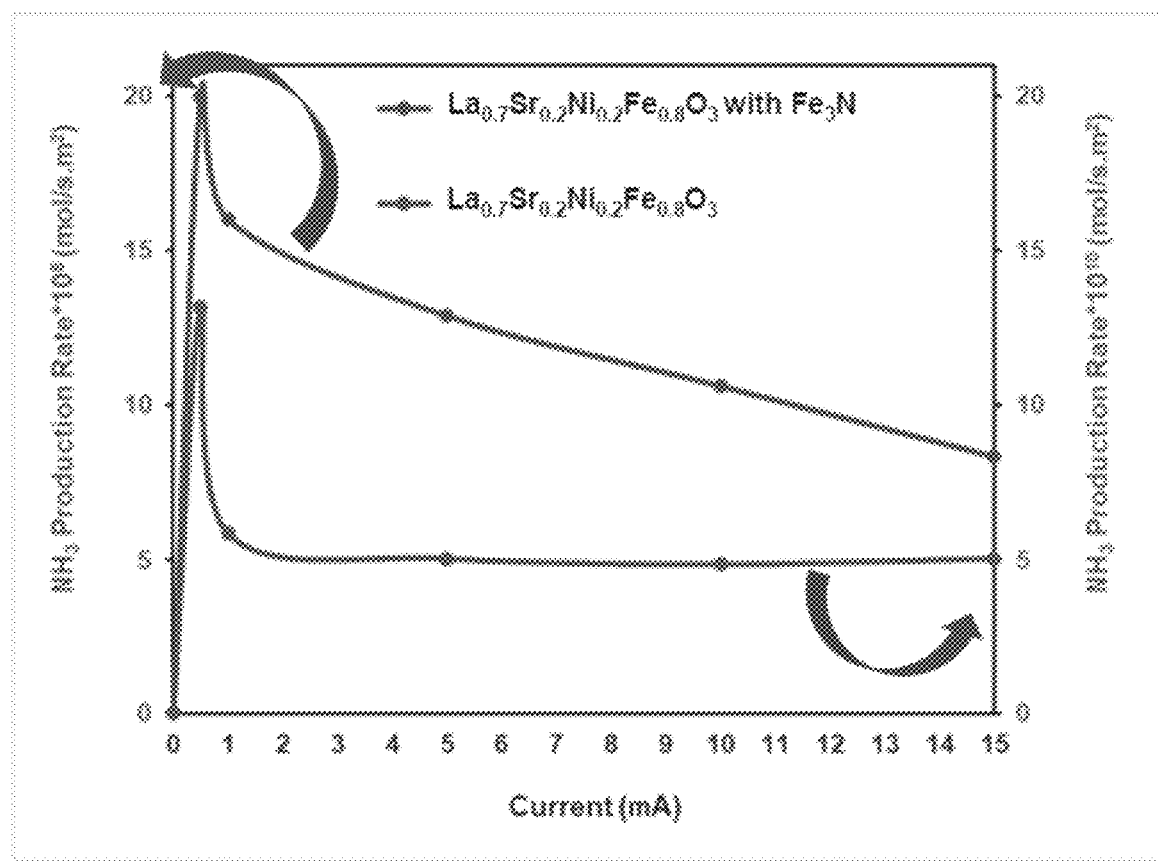
FIG. 11 depicts the ammonia production rate using $La_{0.7}Sr_{0.2}Co_{0.2}Fe_{0.8}O_3$ promoted by $Fe_3N$.

A variety of suitable electrolytes can be used in the electrochemical cells disclosed herein. In some instances the electrolyte can be a solid electrolyte, for instance yttria stabilized zirconia (YSZ), scandia stabilized zirconia (ScSZ), gadolinium doped ceria (GDC), perovskite-type oxides such as lanthanum strontium gallium magnesium oxide (LSGM), lanthanum yttrium germanate (LaYGe), or a combination thereof. Other electrolytes include barium-zirconium-cerium-yttrium oxides, composites of $CsH_2PO_4$ and $SiP_2O_7$, and barium-certium-yttrium oxide. The perovskite oxide(s) (with or without nitride compound) can be printed as a slurry on a surface of the electrolyte and then fired at high temperature (a similar process can be employed for the anodic component). The electrodes can then be affixed to a conductor and placed in electrical communication with power supply. In some implementations, the electrochemical cell can have the general features depicted in FIG. 4.

The power supply can be configured to provide a voltage between the cathode and anode. The power supply can be configured to provide a current in an amount from 0.1-50 mA, from 0.1-25 mA, from 0.1-10 mA, from 0.1-5 mA, from 0.1-2.5 mA, from 0.1-100 A, from 0.5-100 A, from 1-100 A, from 5-100 A, from 10-100 A, from 25-100 A, from 50-100 A, from 0.1-50 A, from 0.5-50 A, from 1-50 A, from 5-50 A, from 10-50 A, or from 25-50 A.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method of generating ammonia, comprising:
   electrochemically reducing $H_2O$ and $N_2$ with a composition comprising a perovskite oxide, to provide $NH_3$ and $O_2^-$; and
   oxidizing the $O_2^-$ to give oxygen gas,
   wherein the perovskite oxide has the formula:

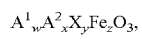
   $A^1{}_wA^2{}_xX_yFe_zO_3$, wherein:
   $A^1$ is selected from La, Tb, Gd, Sm, Pr, and Nd;
   $A^2$ is selected from Sr, Mg, Ca, and Ba;
   X is one or more metals in the +1 or +2 oxidation state;
   w is from 0.5-1.0;
   x is from 0-0.5;
   y is from 0-0.5; and
   z is from 0.5 to less than 1.0;
   wherein w, x, y, and z are chosen to maintain electroneutrality, and
   wherein w, x, y, and z are chosen to maintain electroneutrality, and wherein the composition further comprises one or more nitride compounds having the formula $M_aN_b$, wherein M is selected from Fe, Mb, Co, Cr, and V, a is selected from 1, 2, 3, or and 4, and b is selected from 1, 2, 3, and 4.

2. The method of claim 1, wherein the electrochemical reduction is performed by supplying an electric current to the perovskite oxide of claim 1, wherein the current applied is in an amount from 0.1-50 mA.

3. The method of claim 1, wherein X is Ni, Co, Ti, Mn, Zn, Cu, Li, Al, Sc, V, Cr, Ga, Ge, Y, Zr, Nb, In, V, W, Mb, Pd, Pt, Ag, Au, Cd, or a combination thereof.

4. The method of claim 1, wherein $A^1$ is La.

5. The method of claim 1, wherein $A^2$ is Sr.

6. The method of claim 1, wherein w is from 0.6 to 0.9.

7. The method of claim 1, wherein z is from 0.6 to 0.9.

8. The method of claim 1, wherein X is Ni or Co.

9. The method of claim 1, wherein x is from 0.15 to 0.25.

10. The method of claim 1, wherein y is from 0.15 to 0.25.

11. The method of claim 1, wherein M is Fe.

12. The method of claim 1, wherein the weight ratio of perovskite oxide to nitride compound is from 10:1 to 1:10.

\* \* \* \* \*